(12) United States Patent
Banerjee

(10) Patent No.: US 11,070,556 B2
(45) Date of Patent: *Jul. 20, 2021

(54) CONTEXT-BASED POSSESSION-LESS ACCESS OF SECURE INFORMATION

(71) Applicant: Onion ID, Inc., Hayward, CA (US)

(72) Inventor: Anirban Banerjee, San Bruno, CA (US)

(73) Assignee: Thycotic Software, LLC, Washington, DC (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/515,700

(22) Filed: Jul. 18, 2019

(65) Prior Publication Data

US 2020/0053085 A1 Feb. 13, 2020

Related U.S. Application Data

(63) Continuation of application No. 15/002,611, filed on Jan. 21, 2016, now Pat. No. 10,404,701.

(Continued)

(51) Int. Cl.
*G06F 7/04* (2006.01)
*H04L 29/06* (2006.01)
(Continued)

(52) U.S. Cl.
CPC .......... *H04L 63/10* (2013.01); *H04L 63/0281* (2013.01); *H04L 67/28* (2013.01); *H04L 67/2814* (2013.01); *H04W 12/082* (2021.01)

(58) Field of Classification Search
CPC .......... G06F 21/00; G06F 21/41; G06F 21/53; G06F 21/6218; G06F 2221/2143;
(Continued)

(56) References Cited

U.S. PATENT DOCUMENTS 8,832,231 B1 * 9/2014 Verma ................. H04L 63/0815
709/219
8,850,010 B1 * 9/2014 Qureshi .............. H04L 63/0815
709/225

(Continued)

OTHER PUBLICATIONS

F.A.P Petitooias, Kan Zhang, "WebGroup: A Secure Group Access Control Tool for the World-Wide Web", IEEE Conference Publications, 1998, pp. 301-305, IEEE Xplore Digital Library, Online.

(Continued)

*Primary Examiner* — Gary S Gracia

(57) ABSTRACT

Systems, software, techniques and apparatuses are disclosed herein for facilitating context-based possession-less access to secure information. More specifically, the systems, software, techniques and apparatuses described herein eliminate the need for enterprises to provide employees with direct access to confidential or sensitive enterprise information. Instead, the confidential or sensitive enterprise information can be indirectly provided to and hidden by an access systems used by the employees to request the information prior to being provided to a corresponding resource. For example, in some embodiments, the confidential or sensitive enterprise information is provided to an access system with formatting instructions for hiding the confidential or sensitive enterprise information in a browser session.

20 Claims, 10 Drawing Sheets

Related U.S. Application Data

(60) Provisional application No. 62/125,400, filed on Jan. 21, 2015.

(51) Int. Cl.
*H04L 29/08* (2006.01)
*H04W 12/082* (2021.01)
*G06F 15/16* (2006.01)

(58) Field of Classification Search
CPC ....... G06F 9/5005; H04L 63/10; H04L 67/28; H04L 63/0281; H04L 67/2814; H04W 12/082
See application file for complete search history.

(56) References Cited

U.S. PATENT DOCUMENTS

| | | | |
|---|---|---|---|
| 9,769,285 B2* | 9/2017 | Burkard | H04L 67/2814 |
| 2002/0112056 A1* | 8/2002 | Baldwin | G06F 9/547 |
| | | | 709/225 |
| 2003/0105711 A1* | 6/2003 | O'Neil | G06Q 20/10 |
| | | | 705/39 |
| 2003/0191736 A1* | 10/2003 | Reid | H04L 63/10 |
| 2003/0208562 A1* | 11/2003 | Hauck | H04L 67/02 |
| | | | 709/219 |
| 2005/0114254 A1* | 5/2005 | Condie | H04L 29/06 |
| | | | 705/37 |
| 2006/0294196 A1* | 12/2006 | Feirouz | G06F 16/957 |
| | | | 709/217 |
| 2007/0180125 A1* | 8/2007 | Knowles | G06F 16/9574 |
| | | | 709/227 |
| 2009/0187763 A1* | 7/2009 | Freericks | H04L 67/34 |
| | | | 713/167 |
| 2010/0186078 A1* | 7/2010 | Napoli | H04L 9/3231 |
| | | | 726/9 |
| 2010/0312700 A1* | 12/2010 | Coulter | G06Q 20/108 |
| | | | 705/42 |
| 2011/0154464 A1* | 6/2011 | Agarwal | H04L 63/0815 |
| | | | 726/8 |
| 2011/0238994 A1* | 9/2011 | Baentsch | H04L 63/0884 |
| | | | 713/169 |
| 2012/0018506 A1* | 1/2012 | Hammad | G06Q 30/06 |
| | | | 235/375 |
| 2012/0096069 A1* | 4/2012 | Chan | G06F 9/4856 |
| | | | 709/203 |
| 2012/0102324 A1* | 4/2012 | McNeely | H04L 63/067 |
| | | | 713/168 |
| 2012/0117459 A1* | 5/2012 | DeHaven | G06F 16/9535 |
| | | | 715/234 |
| 2012/0204245 A1* | 8/2012 | Ting | H04L 9/3228 |
| | | | 726/6 |
| 2013/0086655 A1* | 4/2013 | Karp | G06F 21/45 |
| | | | 726/6 |
| 2013/0091350 A1* | 4/2013 | Gluck | H04L 63/0471 |
| | | | 713/153 |
| 2013/0290184 A1* | 10/2013 | Shapiro | G06Q 20/351 |
| | | | 705/44 |
| 2014/0007222 A1* | 1/2014 | Qureshi | H04L 67/10 |
| | | | 726/16 |
| 2014/0032691 A1* | 1/2014 | Barton | H04L 41/00 |
| | | | 709/206 |
| 2014/0089348 A1* | 3/2014 | Vollmert | G06F 16/00 |
| | | | 707/785 |
| 2014/0122730 A1* | 5/2014 | Burch | H04L 63/0807 |
| | | | 709/228 |
| 2014/0173709 A1* | 6/2014 | Eldar | G06F 21/74 |
| | | | 726/7 |
| 2014/0259130 A1* | 9/2014 | Li | H04L 63/0281 |
| | | | 726/6 |
| 2014/0359777 A1* | 12/2014 | Lam | G06F 21/577 |
| | | | 726/25 |
| 2015/0096001 A1* | 4/2015 | Morikuni | H04L 63/08 |
| | | | 726/7 |
| 2015/0195329 A1* | 7/2015 | Jain | G06F 16/957 |
| | | | 709/219 |
| 2015/0215398 A1* | 7/2015 | Chang | G06F 16/957 |
| | | | 726/8 |
| 2016/0119342 A1* | 4/2016 | Kus | H04L 63/08 |
| | | | 713/154 |
| 2016/0212100 A1* | 7/2016 | Banerjee | H04L 63/08 |
| 2016/0212113 A1* | 7/2016 | Banerjee | G06F 21/31 |

OTHER PUBLICATIONS

"Secure Browser Session Enterprise", Google Scholar, Google Scholar Search, Online, http://scholar.google.com/scholar?hl=en&as_sdt=0%2C47&p=secure+browser+enterprise&btnG=[Oct. 10, 2017 12:00:21 PM].

ACM DL Digital Library, U.S. Patent and Trademark Office, "Secure Browser Session Enterprise" search, Online, https://acm.org/results.cfm?query=secure+browser+session+enterprise&Go.y=6[Oct. 10, 2017 12:00:52 PM].

* cited by examiner

CONTEXT-BASED POSSESSION-LESS ACCESS OF SECURE INFORMATION

RELATED APPLICATIONS

This application is a continuation of U.S. patent application Ser. No. 15/002,611, filed on Jan. 21, 2016, entitled "CONTEXT-BASED POSES SION-LESS ACCESS OF SECURE INFORMATION", which claims the benefit of and priority to U.S. Patent Application No. 62/125,400, filed on Jan. 21, 2015, and entitled "Dynamic Payment Information Replacement to Prevent Fraud," and both of which are hereby incorporated by reference in its entirety.

TECHNICAL BACKGROUND

Aspects of the disclosure are related to computing hardware and software technology, and more particularly, to techniques for facilitating context-based possession-less access of secure information.

TECHNICAL BACKGROUND

Enterprises have secure information that must be shared with one or more employees so that those employees can perform their daily functions. For example, employees may need access to financial payment information, e.g., credit card information, to pay for work related expenses or may need access to other sensitive enterprise information, e.g., employer identification numbers, employee tax identification numbers, etc., to, for example, generate bids for government contracts and the like. To function efficiently, the enterprises must hand over this this sensitive information to various employees.

Unfortunately, once handed over the sensitive information is subject to intentional or unintentional misuse or theft. Moreover, as the number of employees that need access to the information increases, so does the possibly that the sensitive information is misused.

Overall, the examples herein of some prior or related systems and their associated limitations are intended to be illustrative and not exclusive. Upon reading the following, other limitations of existing or prior systems will become apparent to those of skill in the art.

OVERVIEW

Provided herein are systems, methods, and software that facilitate context-based possession-less access to secure information. In some embodiments, a cloud-based credential management system is disclosed having one or more computer readable storage media with program instructions stored thereon, which when executed by one or more processors, direct the one or more processors to perform various functions. The functions include determining that a user has authorization to provide secure information to a protected resource, wherein the user has a corresponding user account with the protected resource. The functions further include directing a browser session to display an indication of the authorization to the user via an access system and, responsive to receiving a request for secure information from the access system, verifying an identity of the user and an intent of the request for secure information. The functions further include accessing the secure information if the identity of the user and the intent of the request for secure information are verified, and providing the secure information to an access system with formatting instructions for hiding the secure information in the browser session.

This Overview is provided to introduce a selection of concepts in a simplified form that are further described below in the Technical Disclosure. It may be understood that this Overview is not intended to identify key features or essential features of the claimed subject matter, nor is it intended to be used to limit the scope of the claimed subject matter.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

TECHNICAL DISCLOSURE

Systems, software, techniques and apparatuses are disclosed herein for facilitating context-based possession-less access to secure information. More specifically, the systems, software, techniques and apparatuses described herein eliminate the need for enterprises to provide employees with direct access to confidential or sensitive enterprise information. Instead, the confidential or sensitive enterprise information can be indirectly provided to and hidden by an access systems used by the employees to request the information prior to being provided to a corresponding resource. For example, in some embodiments, the confidential or sensitive enterprise information is provided to an access system with formatting instructions for hiding the confidential or sensitive enterprise information in a browser session.

The techniques introduced herein can be embodied as special-purpose hardware (e.g., circuitry), as programmable circuitry appropriately programmed with software and/or firmware, or as a combination of special-purpose and programmable circuitry. Hence, embodiments may include a machine-readable medium having stored thereon instructions which may be used to program a computer (or other electronic devices) to perform a process. The machine-readable medium may include, but is not limited to, floppy diskettes, optical disks, compact disc read-only memories (CD-ROMs), magneto-optical disks, read-only memories (ROMs), random access memories (RAMs), erasable programmable read-only memories (EPROMs), electrically erasable programmable read-only memories (EEPROMs), magnetic or optical cards, flash memory, or other type of media/machine-readable medium suitable for storing electronic instructions.

Figure 1:
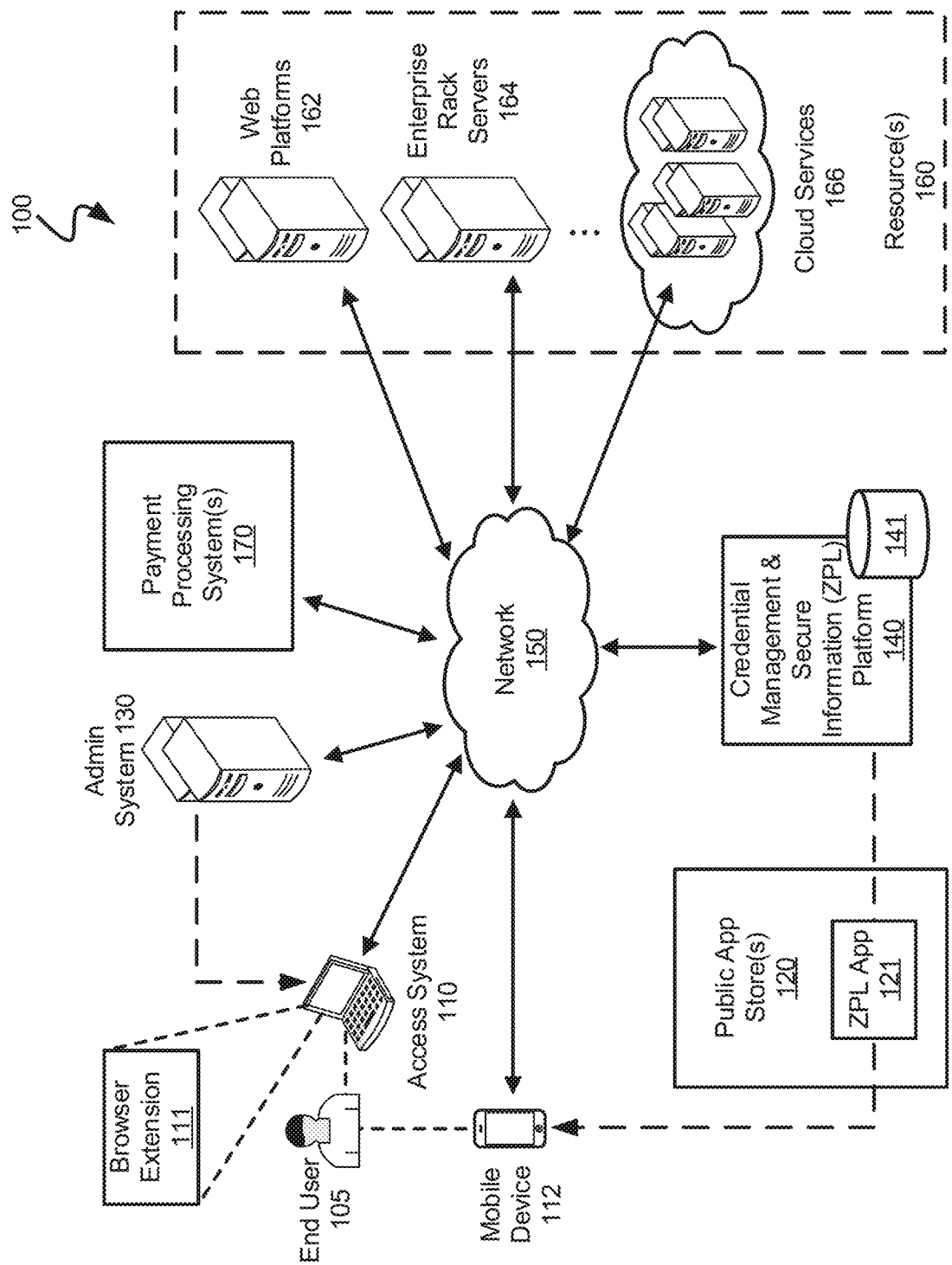
FIG. 1 depicts a block diagram illustrating an example environment for facilitating secure, credential-free user access to resources and context-based possession-less access to secure information, according to some embodiments.

FIG. 1 depicts a block diagram illustrating an example environment 100 for facilitating secure, zero password user access to resources 160 via a credential management and secure information (zero password login) platform 140 (also referred to herein as a "transparent proxy system"), according to some embodiments. More specifically, the example of FIG. 1 illustrates an environment in which end user 105 can obtain secure access to the resources 160 without providing user credentials (or login information) directly to the access system 110 (i.e., device which the end user is using to attempt to access the resource). As discussed herein, the credential management and secure information (zero password login) platform 140 can also provide context-based possession-less access to secure information.

As shown in the example of FIG. 1, environment 100 includes the access system 110, a mobile device 112, a public app store 120 having a ZPL app 121 available for download, a credential management and secure information (ZPL) platform 140, a database or storage unit 141, various resources 160, and one or more payment processing system 170. As shown, and by way of example and not limitation, the resources 160 can include web platforms 162, enterprise rack servers 164, and cloud services 166. In the example of FIG. 1, the access system 110 and the mobile device 112 are under the control of end user 105. A single end user 105, access device 110 and mobile device combination is shown for simplicity; however, the example environment 100 can include any number of access systems 110 and the mobile devices 112 under the control of any number of end users 105. Moreover, although shown as a single entity, it is appreciated that the credential management and secure information (ZPL) platform 140 can be physically and/or functionally distributed.

Prior to operation, one or more resources and devices are registered with the credential management and secure information (ZPL) platform 140. For example, the end user 105 can register details about a given resource and secondary security device(s), e.g., mobile device 112, with the credential management and secure information (ZPL) platform 140. In some embodiments, the device information can include contact information for secondary security devices such as, for example, a mobile number or IP address of an application operating on mobile device 112. Additionally, in some embodiments, an end user directs a secondary security device, e.g., mobile device 112 to download and installs the ZPL app 121 from the public app store 120 on mobile device 112 as part of a registration process with the credential management and secure information (ZPL) platform 140.

The registration details include at least some authentication or login credential information so that the user does not need to maintain (remember) and/or otherwise provide this information when accessing the resource. For example, an end user can provide username and password information for accessing the end user's Facebook™ account. Moreover, in the enterprise context, system administrators can increase the frequently in which they modify passwords to, for example, enterprise rack servers 164 for heightened security. The registration process can include selection and/or configuration of policies and policy information. The policies can include, by way of example, relative device proximity policies, geofencing policies, biometric identification policies, movement policies, etc.

The relative device proximity policies can include, for example, directing the mobile device 112 and/or the access system 110 to detect and report on their proximity. In some embodiments, the proximity can be determined based on Bluetooth connectivity or a determination as to Bluetooth RSSI strength to ascertain a physical distance between the mobile device 112 and the access system 110 (e.g., the machine used to attempt to access the resource). In such cases, RSSI strength being greater than a threshold can indicate that the mobile device 112 and the access system 110 are sufficiently proximate to satisfy the relative device proximity policy.

The geofencing policies can include, for example, directing the mobile device 112 and/or the access system 110 to detect and report geolocation information. In some embodiments, the system may already have this information as part of the request. For example, the geolocation information can include the IP address used to access the resource. In other instances, the policies can be configured to request an IP address from the mobile device as well. In any case, access to the resource is granted only when the user is within a predetermined geographical location or area. If the access systems 110 and/or the mobile device 112 is outside that predetermined location or areas, then access is not granted.

The biometric identification policies can include, for example, directing the mobile device 112 and/or the access system 110 to obtain fingerprint, retina, face, voice or biometric based identification information from the end user 105 and to report the information to the credential management and secure information (ZPL) platform 140.

The movement policies can include, for example, directing the mobile device 112 and/or the access system 110 to obtain movement information from the end user 105. The movement can include an air signature such as, for example, movement of the mouse, or a registered device such as mobile phone 112 to make a signature in the air, including shaking of a device in a specific manner, etc.

In the various examples discussed herein, authentication information is primary requested from the mobile device 112 and/or the access system 110. It is appreciated that any number of devices (including secondary authentication devices) can be registered and the various polices configured to direct those devices to obtain and send information to the credential management and secure information (ZPL) platform 140 for authentication.

As discussed herein, authentication polices can be configured for conditional or unconditional multi-factor authentication. For example, as discussed in more detail below, in some embodiments, various score or risk factors can be used to determine whether multi-factor authentication is triggered or whether additional factors of the multi-factor authentication should be utilized by the system to authenticate the user.

Although not illustrated for simplicity, in the example operation of FIG. 1, the end user 105 has downloaded and installed the ZPL app 121 from the public app store 120 onto mobile device 112. Additionally, access system 110 may be configured with a browser extension 111.

Additionally, as discussed herein, the credential management and secure information (ZPL) platform 140 can act as a transparent proxy system to facilitate context-based possession-less access to secure information. More specifically, the credential management and secure information (ZPL) platform 140 eliminates the need for enterprises to directly provide employees with access to, or possession of, confidential or sensitive enterprise information. Instead, the confidential or sensitive enterprise information can be indirectly provided and hidden by access systems used by the employees, e.g., end user 105 prior to submission to a protected resource. In some embodiments, the confidential or sensitive enterprise information is provided to an access system 110 with formatting instructions for hiding the confidential or sensitive enterprise information in a browser. The instructions or operations may be performed and/or otherwise handled by browser extension 111.

Figure 2A:
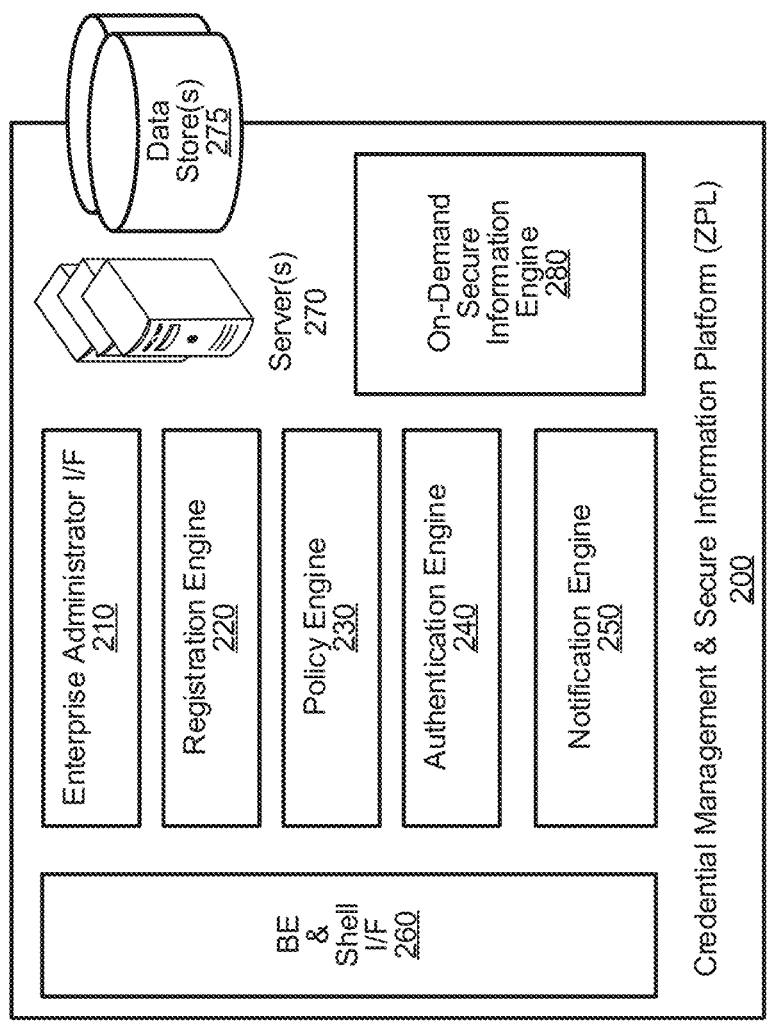
FIGS. 2A-2C depict example components of a credential management and secure information (zero password login) platform, according to some embodiments.
Figure 2B:
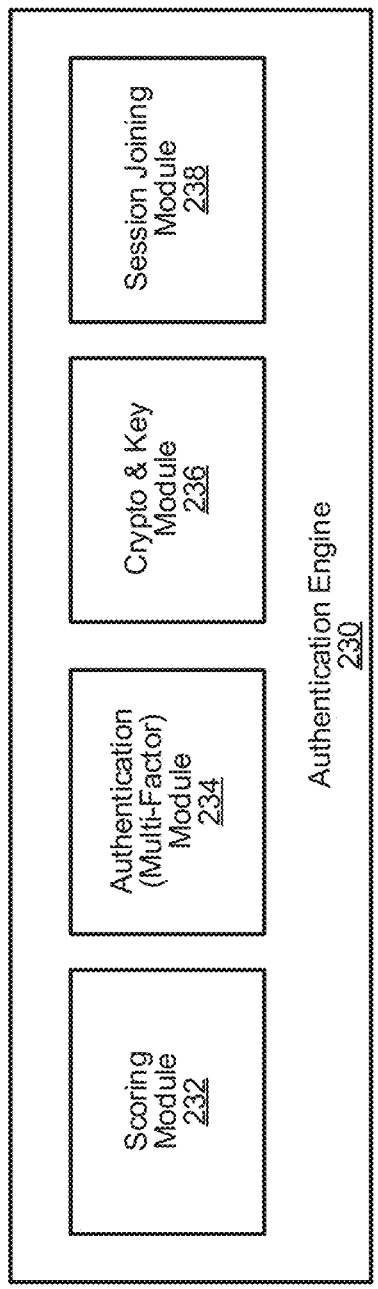
Figure 2C:
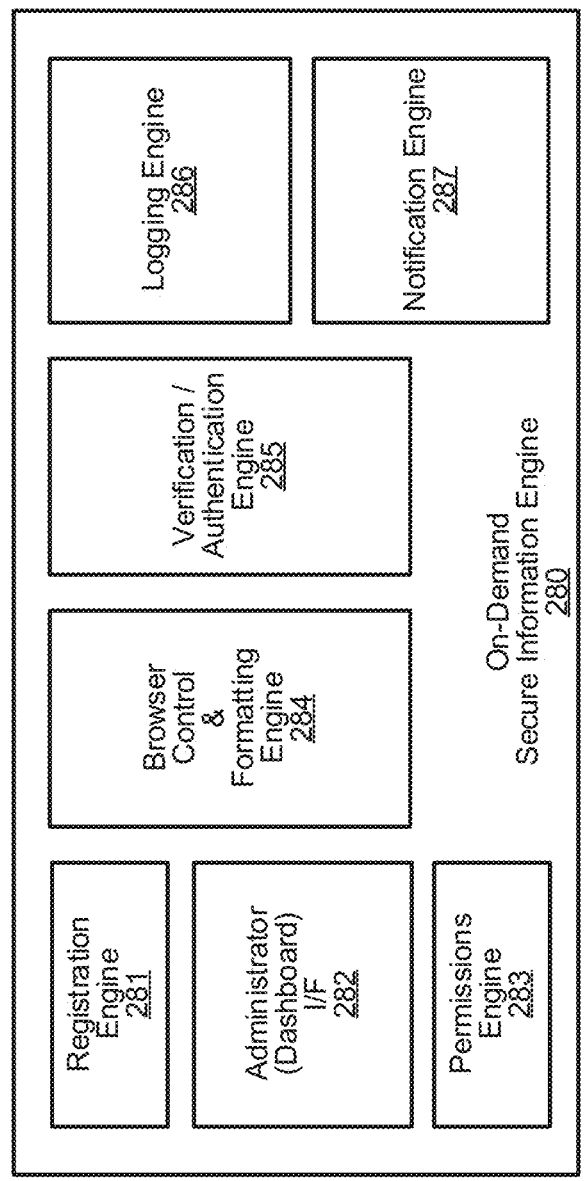

FIGS. 2A-2C depict example components of a credential management and secure information (zero password login) platform 200, according to some embodiments. The credential management and secure information (zero password login) platform 200 can be the credential management and secure information (zero password login) platform 140 of FIG. 1, although alternative configurations are possible. The functions represented by the components, modules and/or engines described herein can be implemented individually or in any combination thereof, partially or wholly, in hardware, software, or a combination of hardware and software.

As illustrated in the example of FIG. 2A, the credential management and secure information (zero password login) platform 140 includes an enterprise administrator interface 210, a registration engine 220 a policy engine 230, an authentication engine 240, a notification engine 250, a browser extension (BE) and shell interface 260, one or more servers 270, one or more data stores 275, and an on-demand secure information engine 280. Other systems, databases, and/or components are also possible. Some or all of the components can be omitted in some embodiments.

The enterprise administrator interface 210 is configured to interface with enterprise administrators in some embodiments. In enterprise settings, an enterprise administer can provide the credential management and secure information (zero password login) platform 200 with various registration and/or policy information. For example, the enterprise administrators can configure servers, e.g., enterprise rack servers 164, for protected access and/or periodically change passwords for enhanced security.

The registration engine 220 is configured to interface with an end user, administer, or bot to setup and/or update various resource registration information. As discussed here, the credential management and secure information (zero password login) platform 200 facilitates secure access to various resource by providing the authentication credentials to for, example, a browser extension executing on a web browser of an access device responsive to a request by an end user and subsequent verification that the end user is in fact who they say they are.

The policy engine 230 is configured to store and present various policy configuration options to end users and or system administers. The authentication engine 240 is configured to detect and apply the policies. A more detailed example of an example authentication engine is shown and discussed in greater detail with reference to FIG. 2B.

The notification engine 250 is configured to generate and provide various notifications to end users and/or system administrators. Notification can be sent, for example, to access system for display to an end users responsive to protected resource access requests. The BE and shell interface 260 is configured to interact with browser extensions installed on access systems, shell interfaces on access systems, and/or any other software modules or programs that are installed on access systems that are registered and configured to access the credential management (ZPL) platform.

The on-demand secure information engine 280 is shown and discussed in greater detail with reference to FIG. 2C, below.

Referring now to FIG. 2B, which depicts example components of the authentication module 230, according to some embodiments. As illustrated in the example of FIG. 2B, the authentication engine 230 includes a scoring module 232, an authentication (multi-factor) module 234, a crypto & key module 236, and a session joining module 238.

In the example of FIG. 2B, the scoring module 232 is configured to calculate a security level from the browsing behavior of an end client by generating a security-level evaluation, which is referred to herein as a score. By way of example, the score can be in the form of one or more of: a numerical score, an alphanumeric set of characters, or a visual identifier, such as color, sound, including combinations and/or variations thereof.

In some embodiments, the score can be used, for example, (a) to revoke a session ID to prevent an end user from accessing a resource, (b) as an answer to a third party or a resource that may choose to act upon it, (c) to ask the end user to for additional verification using other means. The score can be calculated in whole or in part at the credential management and secure information (ZPL) platform 140, the access system 110, and/or the mobile device 112, or any other electronic device.

In some embodiments, the system assesses, summarizes and depicts the security level of a browsing session that is allowing an end client to access a resource by generating a security-level score. The score can be in the form of a numerical score, an alphanumeric set of characters, and/or a visual identifier, such as color, sound, etc. In some embodiments, the goal of the score is to identify if the browsing behavior of the person who is accessing the protected resources deviates from the learned experience that has been taught to the system.

In some embodiments, the score can be generated based on any number of factors and can consider various broad categories. By way of example, the score can consider the following broad categories: the browsing behavior of the end client such as mouse pointer speed, scrolling speed, focus of the actions being performed on a webpage and more; external and historical information about how users are using the website; the likelihood of the end client accessing the resource at the time it is being accessed, where it is being accessed from and more; additional features that aid in the identification and/or classification of an end client's browsing behavior; etc.

In some embodiments, the score is calculated or generated using a multi-level approach which can be implemented as a hierarchy of modules. In some instances, a separate partial score can generated for each of these multiple categories. For example, there can be a module for each category and each module may consist of additional modules assessing specific aspects. In some embodiments, the system analyzes a site along multiple dimensions (i.e., with respect to a plurality of different website properties). The partial scores can then collected and combined by an integration module to generate the final score.

In some embodiments, the various techniques discussed herein may be performed a client side web-browser extension, a proxy, or a computer program that runs on an access system or secondary authentication device. The calculation of the score can use one mathematical function that incorporates all the indications and information pertinent to verifying the authenticity of the end client's, e.g., access systems, attempt to access the resource.

In some embodiments, the mechanism to calculate the security level of a site is highly customizable allowing the addition or deletion of parameters and factors, as the technology and business practices evolve.

In some embodiments, the security level of a site, can be represented in a non-limiting way as: (a) a numerical score, (b) an alphanumeric set of characters (e.g., B+), (c) a visual identifier, such as color, (d) a sound, (e) a graphical depiction such as a plot, or a set of multiple instances of all the above. Additionally, the system can generate detailed reports showing why the security level of a site is as reported and accompanied by optional tips on how to improve the score. The level of detail of this information can be defined by a tunable parameter that ranges from the raw output of all the data that the invention processed or it can be aggregated at an easier-to-understand level of granularity.

The authentication (multi-factor) module 234 is configured to provide a configurable multi-factor authentication. The multi-factor authentication is configured such that it is not intrusive, time consuming or confusing. The system can provide various multifactor authentication techniques that may seem invisible yet effective at ascertaining the authenticity of the identity of the end client.

The various options include but may not be limited only to (1) Bluetooth RSSI strength to ascertain how far physically a mobile or tablet device is from a machine used to access the resource (2) Geo-location fencing, based on the IP address used to access the resource, to make sure that access to the resource is granted only if the user is in certain geographical locations or is not granted of the user is in certain geographical locations. (3) Fingerprint, retina, face, voice or biometric based identification provided for by the device that is being used to access the resource or any other device that may have been registered as a second factor device by the end client (4) an air signature—movement of the mouse, or a device like a mobile phone to make a signature in the air, including shaking of a device in a specific manner and more.

The crypto & key module 236 is configured to securely store credentials for the end client, e.g., the access system and/or the end user, in the one or more data stores 275. For security, the stored credentials are encrypted. In some embodiments, the encryption can be accomplished through cryptography where multiple keys are generated and maintained on various machines not belonging to the end client.

The session joining module 238 is configured to join multiple sessions as discussed herein. An example of session joining is shown and discussed in greater detail with reference to FIG. 6. In some embodiments the credentials may never be transferred in any way shape or form to the access system. In such instances, only session IDs are transferred to the device being used. The system can help expire the session after a specified amount of time as set by the administrator of the organization or the end client themselves.

For example, in some embodiments, the cloud store proceeds to provide the end client with a valid session ID whenever they would like to use a protected resource, by using the stored encrypted credentials and the encryption key of the end client used to store the credentials in the first place. This allows for passwords and usernames to never reach the clients computer yet provide a seamless login experience. Furthermore the system can use various factors to determine of the end client trying to access the resource is actually the person/end client allowed to do so or not by using various features on their mobile phones, tablets, google glass and other devices.

FIG. 2C depicts example components of the on-demand secure information engine 280, according to some embodiments. As illustrated in the example of FIG. 2C, the on-demand secure information engine 280 includes a registration engine 281, an administrator (dashboard) I/F 282, a permissions engine 283, a browser control and formatting engine 284, a verification/authentication engine 285, a logging engine 286, and a notification engine 287. Other embodiments of the on-demand secure information engine 280 are also possible with more or fewer components.

The registration engine 281 is configured to allow an enterprise to register secure information along with permissions information and usage parameters associated with the secure information. The permissions information can include an indication of which employees (end users) or groups of employees (groups of end users) have permission and/or are otherwise authorized to access the secure information as well as usage context, e.g., indications as to which resource or resources the secure information can be provides (or is otherwise acceptable). In some embodiments, the secure information can include a wallet or enterprise payment information. For example, the wallet can include any number of payment options, e.g., credit cards, etc., associated with the enterprise.

The permissions information can indicate the payment information to which end users (employees) have access. In some embodiments, the permissions information is registered on a group-by-group basis. For example, end users from each group of an enterprise, e.g., Marketing, Legal, Engineering, etc., can have access to corresponding enterprise credit card. Likewise the usage parameters can indicate limits or boundaries on the use of the secure information within a resource.

Thus, once registered, access to the secure information is context-based. For example, if Amazon.com is registered as a protected resource, then a user can login with zero password and utilize a company credit card if the user has permission to access the credit card. Advantageously, the user (employee) can be provided with use of the credit card information on Amazon.com without giving the user (employee) the credit card number, expiration data, CVV number, etc. This reduces the risk of malicious (unverified) use of the credit card and/or risk of the credit card number being accidently disseminated by the user, e.g., stolen.

The administrator (dashboard) I/F 282 is configured to provide an interface, e.g., graphical user interface, to enterprise administers, managers, etc., facilitating the entry of secure information along with permissions information and usage parameters. The permissions engine 283 is configured to handle the permissions received during registration or modifications to the permissions.

The browser control and formatting engine 284 is configured to generate formatting instructions for hiding the secure information in a browser session at an access system and/or otherwise controlling the browser session including launching of one or more browser sessions. As discussed herein the formatting instructions can include instructions for making portions of a browser session, e.g., page, form, etc., non-transparent to the end user so that the end user does not gain access to the secure information but is still able to provide the secure information to a protected resource. For example, individual objects can be "blacked out" on a web page.

In some embodiments, the formatting instructions can alternatively or additionally include one or more non-transparent layers that are added to all or a portion of the browser session, e.g., page, form, etc. For example, additional blacked out layers can be placed on top of blacked out objects to further deter hackers from attempting to gain access to the secure information. In some embodiments, the formatting instructions can cause the browser to automatically submit the secure information to the resource as soon as the secure information is populated in the browser session. This can ever further reduce attempts to misuse and/or otherwise gain access to the secure information as it is sent away to the resource as soon as it is received.

The verification/authentication engine 285 is configured to facilitate verification of the identity of a user attempting to provide a resource with secure information and verify an intent or purpose for providing the information.

Verifying the identity of the user attempting to provide a resource with secure information can include performing additional or supplemental authentication of a user via for example, the user's mobile device. For example, geolocation information including one or more of GPS information or Internet Protocol address information can be requested from the mobile device to further verify or authenticate the identity of the user.

Alternatively or additionally, proximity information indicating a proximity between the mobile device and the resource access system or other information can be requested from the mobile device to further verify or authenticate the identity of the user. For example, an established Bluetooth connection can be indicative of the mobile device and the resource access system being within the predetermined distance that is sufficient to verify or authenticate the identity of the user. Furthermore, fingerprint, retina, face, voice or biometric based identification can also be requested for input by the user via the mobile device.

Verifying the intent or purpose for providing the information can include processing the usage parameters received during registration to determine if the intent is acceptable. As discussed above, the usage parameters can define a scope of acceptability. For example, if the intent is to purchase work software on Amazon.com, the usage parameters can be processed to make sure the user is allowed to purchase the software and that the software does not exceed a maximum amount of money, etc. Any number of usage parameters are possible. Moreover, in some embodiments, the usage parameters granularity can be set by group, by protected resource, on a user-by-user basis, etc.

The logging engine 286 and the notification engine 287 are configured to log or track requested and transferred information and providing notifications to administers, users, etc., respectively.

Figure 3:
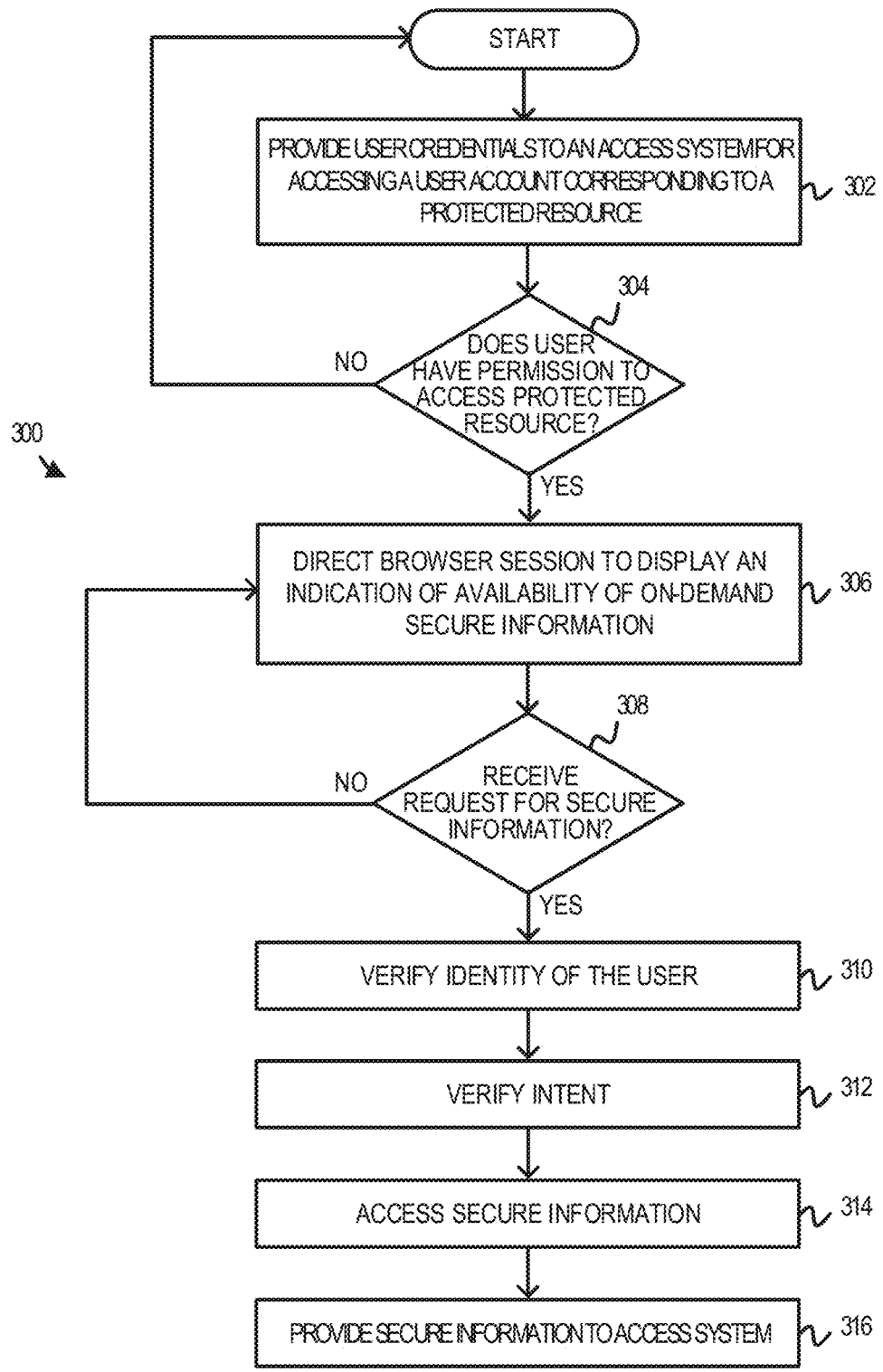
FIG. 3 depicts a flow diagram illustrating example operation of a credential management and secure information (zero password login) platform for facilitating context-based possession-less access to secure information, according to some embodiments.

FIG. 3 depicts a flow diagram illustrating an example operation 300 for facilitating context-based possession-less access to secure information subsequent to providing login credentials to an access system for zero password login, according to some embodiments. The example operation 300 may be performed in various embodiments by a credential management & secure information (zero password login) platform such as, for example credential management & secure information (zero password login) platform 140 of FIG. 1 or 200 of FIG. 2, one or more processors, and/or other modules, engines, components or tools associated with a credential management & secure information (zero password login) platform.

As discussed above, prior to execution of operation 300 it is assumed that one or more resources have been registered for the end user.

To begin, at step 302, the credential management & secure information (zero password login) platform provides user credentials to an access system for accessing a user account corresponding to a protected resource. The user account belongs to a user, e.g., end user 105 of FIG. 1 operating the access system, e.g., access system 110 of FIG. 1. The access system is subsequently is logged into and/or otherwise has access to the protected resource. Example steps leading up to this process are shown and discussed in greater detail with reference to FIG. 5.

At decision step 304, the credential management & secure information (zero password login) platform determines whether the user has authorization to provide secure information to the protected resource. As discussed herein the secure information refers to confidential or sensitive enterprise information. In some embodiments, the determination is based on registration information provided to the registration engine 281. For example, an enterprise can register secure information with the credential management & secure information (zero password login) platform. The registration can include providing information on which employees (end users) or groups of employees (groups of end users) have permission and/or are otherwise authorized to access the information.

In some embodiments, the information can include a wallet including various enterprise payment information, e.g., credit card information. The wallet can include any number of payment options, e.g., credit cards and the employees or groups that are authorized to use those credit cards for business related purchases. For example, different credit card information can be provided for different groups in an enterprise, e.g., Marketing, Legal, Engineering, etc. End user's (or employees) can be added to one or more of the groups or have one or more authorizations when they are registered or added to the system. Moreover, the authorization is context-based. For example, Amazon.com can be a protected resource to which a user can login with zero password and utilize a company credit card. Advantageously, the user (employee) can be provided with use of the credit card without giving the user the credit card number. This reduces the risk of malicious (unverified) use of the credit card and/or risk of the credit card number being accidently disseminated by the user, e.g., stolen.

If the user has authorization to provide secure information to the protected resource, e.g., access to use of the secure information, at step 306, the credential management & secure information (zero password login) platform directs the browser session to display an indication of availability of on-demand secure information. For example, a button or other indicator can be added to the browser session page. In some embodiments, a symbol can be used to indicate the type of information. For example, a "S" symbol can be used to indicated to the end user (employee) that financial information is available for the particular resource. Alternatively or additionally, a button might say "Fill in the company credit card information." In some embodiments, the browser extension can determine which indicator is presented to the end user (employee) based on, for example, end user preferences or predetermined enterprise configurations.

At step 308, the credential management & secure information (zero password login) platform determines if it has received a request for secure information from an access system. The request for secure information can be generated by an access system responsive to an end user hitting the indicator button and/or otherwise requesting that the secure information be provided. Alternatively, the request for secure information can be received by the credential management & secure information (zero password login) platform in response to the end user submitting a page (purchase) request with placeholder or no information in the secure information fields.

If a request for secure information from an access system is received, at step 310, the credential management & secure information (zero password login) platform verifies the identity of the end user. Once the identity of the user is verified, at step 312, the credential management & secure information (zero password login) platform verifies the intent of the request for secure information. Once the intent of the request for secure information is verified, at step 314, the secure information is accessed. As discussed herein, the secure information can be stored on one or more securely encrypted database.

At step 316, the credential management & secure information (zero password login) platform provides the secure information to the access system with formatting instructions for hiding the secure information in a browser session.

Figure 4A:
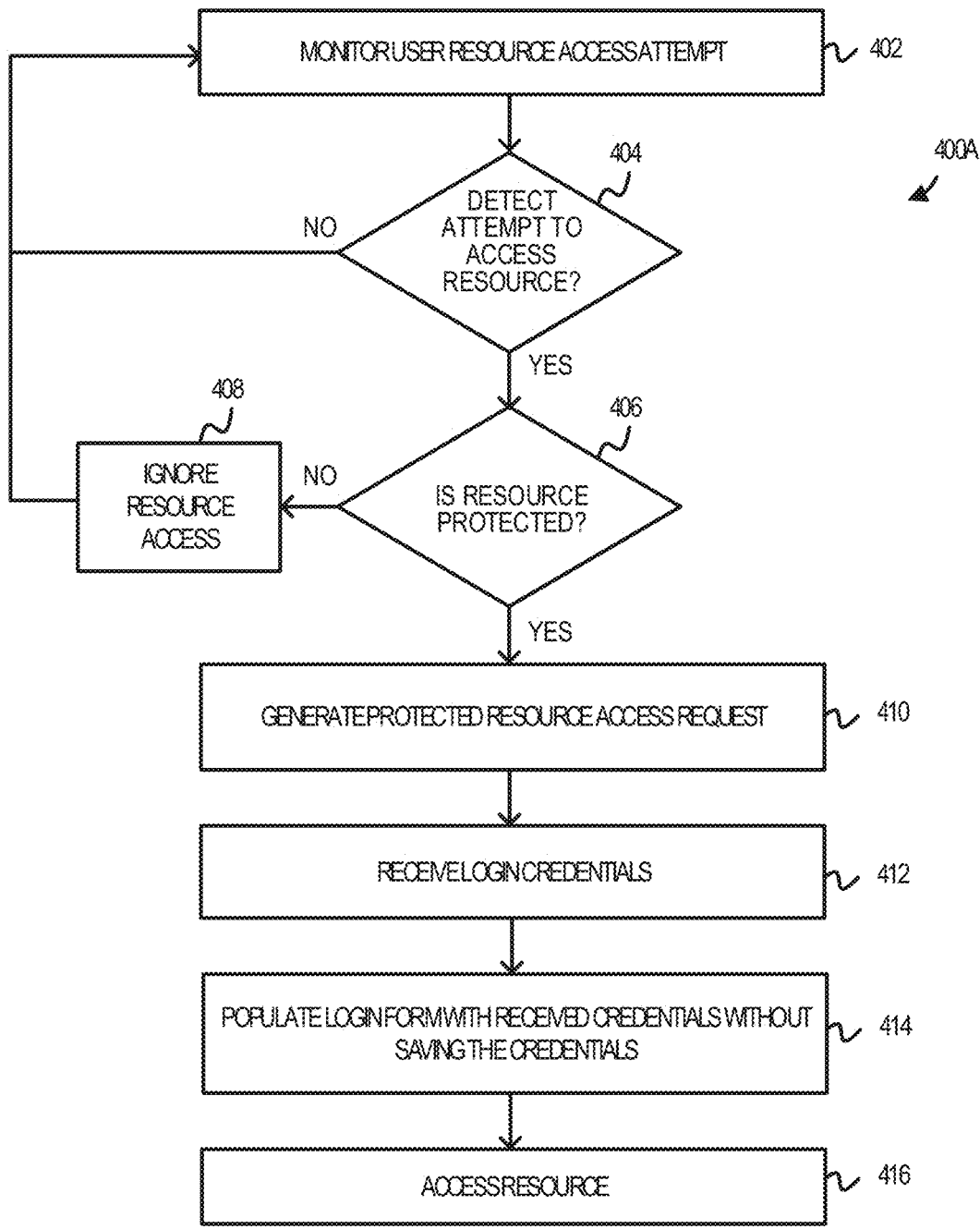
FIGS. 4A and 4B depict flow diagram illustrating example operation of a browser extension for operating with a web browser on an electronic computing device, according to some embodiments.

FIG. 4A depicts a flow diagram illustrating an example operation 400A of a browser extension for operating with a web browser on an electronic computing device, according to some embodiments. The example operation 400A may be performed in various embodiments by an access device and, more particularly, a browser extension operating with a web browser on the access device such as, for example, browser extension 111 operating on access system 110 of FIG. 1.

As discussed above, prior to execution of example operation 400A it is assumed that one or more resources have been registered for the end user.

To begin, at step 402, the browser extension monitors user resource access attempts. At decision step 404, the browser extension detects whether a user resource access attempt is detected. If a user resource access attempt is detected, at decision step 406, the browser extension determine if the resource is protected. However, if a user resource access attempt is not detected, the browser extension returns to monitoring step 402.

If the resource is protected, at step 410, the browser extension generates a protected resource access request. At step 412, the browser extension receives login credentials. Lastly, at step 414, the browser extension populates the login form with the received login credentials without saving the login credentials to system memory. Because the login credentials are not saved system memory, the credentials are no longer present or accessible via the access system once the credentials have been submitted to the resource for access.

Figure 4B:
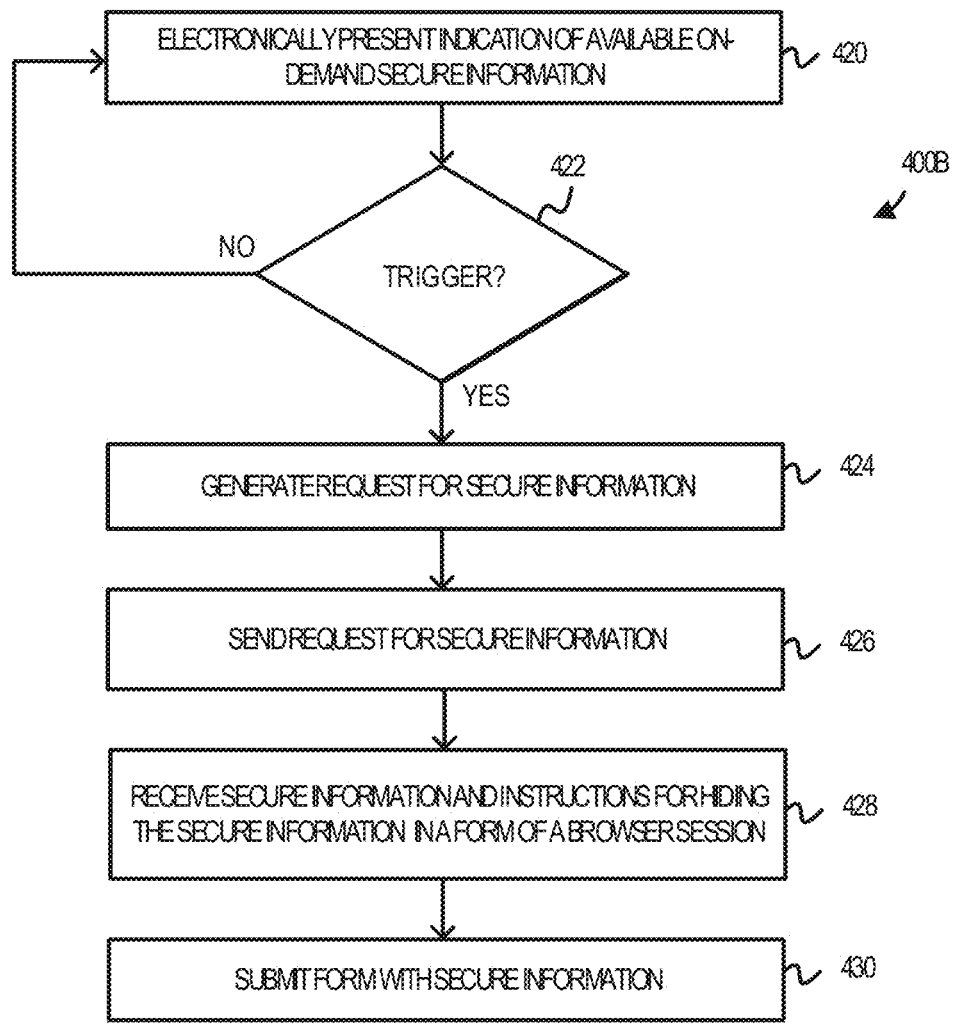

FIG. 4B depicts a flow diagram illustrating an example operation 400B of a browser extension for operating with a web browser on an electronic computing device, according to some embodiments. The example operation 400B may be performed in various embodiments by an access device and, more particularly, a browser extension operating with a web browser on the access device such as, for example, browser extension 111 operating on access system 110 of FIG. 1.

Prior to execution of example operation 400B it is assumed that the access system has gained access to the resource e.g., as shown in operation 400A.

To begin, at step 420, the browser extension electronically presented an indication of available on-demand secure information to an end-user, e.g., via a browser session. At decision step 422, the browser extension determines if a trigger for secure information is triggered. As discussed herein, in some embodiments, the trigger can occur responsive to selection of an indication button on a page of the browser session or submitting a page or form of the browser session.

At step 424, the browser extension generates a request for secure information and, at step 426, sends the request for delivery to the credential management & secure information (zero password login) platform. At step 428, the browser extension responsively receives the secure information and instructions for hiding the secure information in a portion, e.g., form or page, of a browser session. Lastly, at step 430, the browser extension submits the form with the secure information for delivery to the resource.

Figure 5:
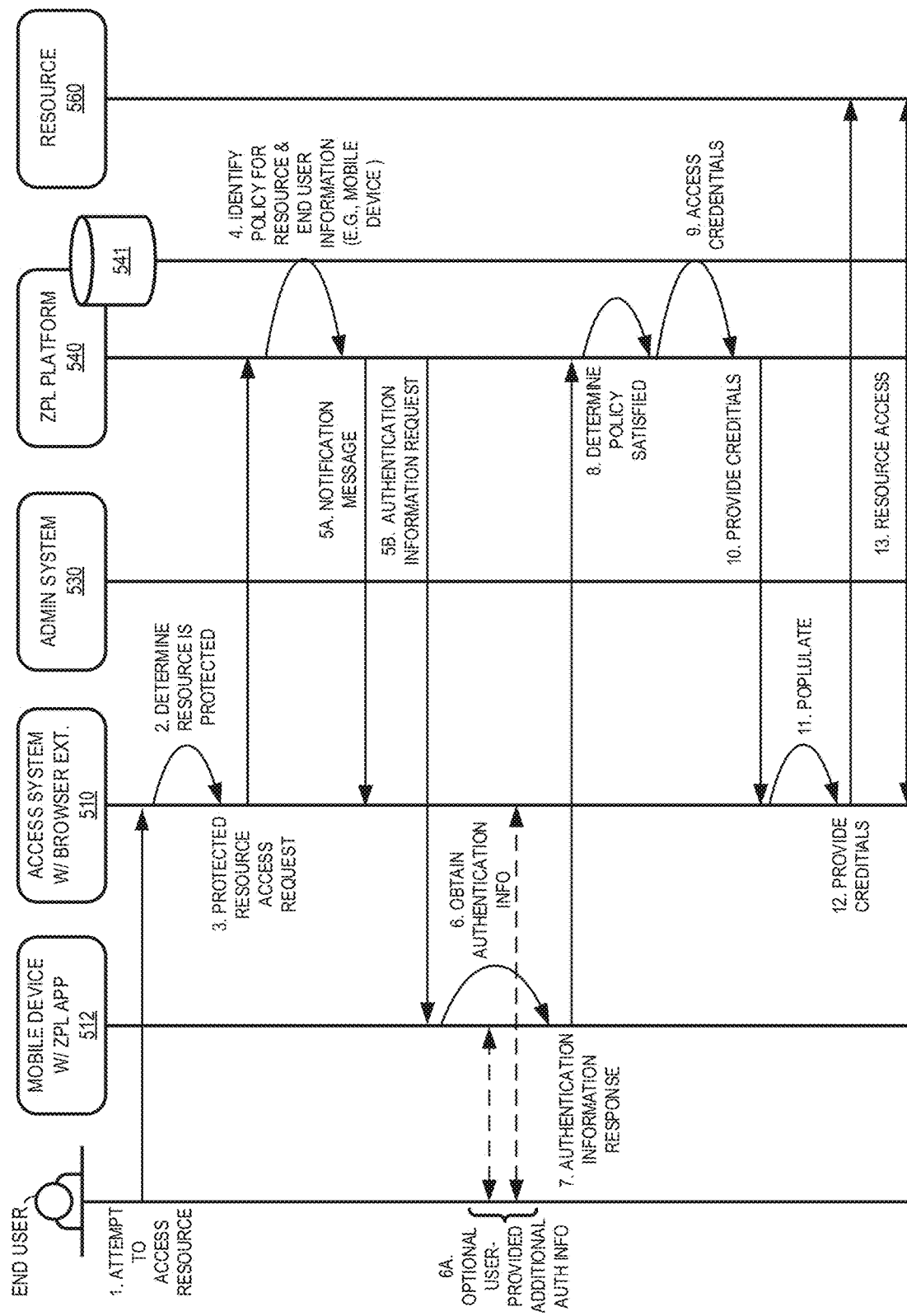
FIG. 5 depicts a sequence diagram illustrating example operation in an example for facilitating secure, credential-free user access to resources, according to some embodiments.

FIG. 5 depicts a sequence diagram illustrating example operation of various devices, systems, and an end users for facilitating secure, zero password user access to resources via credential management and secure information (zero password login) platform, according to some embodiments. More specifically, FIG. 5 illustrates a scenario in which an end user is attempting to gain credential-free access to privileged resource 560 via a credential management and secure information (ZPL) platform 540. The privileged resource 560 and the secondary authentication device, i.e., the mobile device 512, have been previously registered with the credential management and secure information (ZPL) platform 540.

The example of FIG. 5 includes a secondary authentication device (mobile device 512 having a ZPL application installed thereon), an access system with a browser extension 510, an administrator system 530, a credential management and secure information (zero password login) platform 540 with data store 541, and a resource 560. Initially, at step 1, the end user attempts to access the resource. For example, the end user may open a web browser and enter the URL www.Facebook.com to access the user's Facebook™ account. At step 2, the browser extension executing on the web browser detects that Facebook™ is a privileged resource. The browser extension can detect that the resource is a privileged resource by, for example, looking up a hash value stored inside the browser locally. At step 3, the browser extension responsively generates and sends a protected resource access request to the credential management and secure information (ZPL) platform 540.

At step 4, the credential management and secure information (ZPL) platform 540 processes the protected resource access request to identify a predetermined authentication policy corresponding to the privileged resource and various end user information for verifying the identity of the end user. For example, the end user information can include information about a secondary authentication device i.e., the mobile device 512. Optionally, at step 5A, the credential management and secure information (ZPL) platform 540 responsively generates and sends a notification message to the access system. The notification message can be displayed by the access system to the end user and indicate a variety of information. For example, the notification might identify the policy or policies associated with the resource and provide the end user with status information regarding the authentication "Facebook™ is on policy 1: Geofencing. We are currently verifying that you are located in the predetermined geofence area." It is appreciated that more or less information can be provided to the end users.

Once the secondary authentication device (mobile deice 512) is identified, at step 5B, the credential management and secure information (ZPL) platform 540 generates and sends an authentication information request to the secondary authentication device (mobile device 512). The authentication information request indicates additional information to be obtained by the secondary authentication device. As discussed above, the additional information that is requested can be determined by the policy or policies that are preconfigured for accessing the resource during the registration process. By way of example, the additional information can include relative device proximity information, geolocation information (e.g., GPS or IP information), biometric information, device movement information, PIN information, etc. Although a single request for information is shown, it is appreciated that the credential management and secure information (ZPL) platform 540 may request additional information more than once depending on the policy and/or the information obtained in the authentication information responses.

In some embodiments, the ZPL application running on the mobile device processes the authentication information request and, at step 6, obtains the requested information. As discussed, in some instances, the mobile device, at step 6A, can request that the user provide some input, e.g., movements, fingerprint, retinal scan, etc. Once the requested information is obtained, at step 7, the mobile device 512 generates and sends an authentication information response to the credential management and secure information (ZPL) platform 540. At step 8, the credential management and secure information (ZPL) platform 540 processes the response to determine whether the policy is satisfies. If so, at step 9, the credential management and secure information (ZPL) platform 540 accesses the credentials from the data store 541. In some embodiments, the credentials might need to be decrypted at the credential management and secure information (ZPL) platform 540 and/or the access system 510.

At step 10, the credential management and secure information (ZPL) platform 540 provides the credentials to the access system 510 and, more particularly, the browser extension operating with a web browser on the access system 510. At step 11, the browser extension populates the webpage or other login form with the credentials but does not otherwise store the credentials. At step 12, the access system 510 provides the credentials and/or otherwise submits the login form to the resource and, at step 13, resource access is established. Once submitted, the credentials are no longer available or stored on the access system 510.

Although not shown, in some embodiments, the credential management and secure information (ZPL) platform 540 can alternatively log into Facebook on behalf of the user and provide session information to the browser extension. For example, the credential management and secure information (ZPL) platform 540 can provide a php session ID to the browser extension. The browser extension can subsequently refresh the page with the session ID to then establish the resource access.

Figure 6:
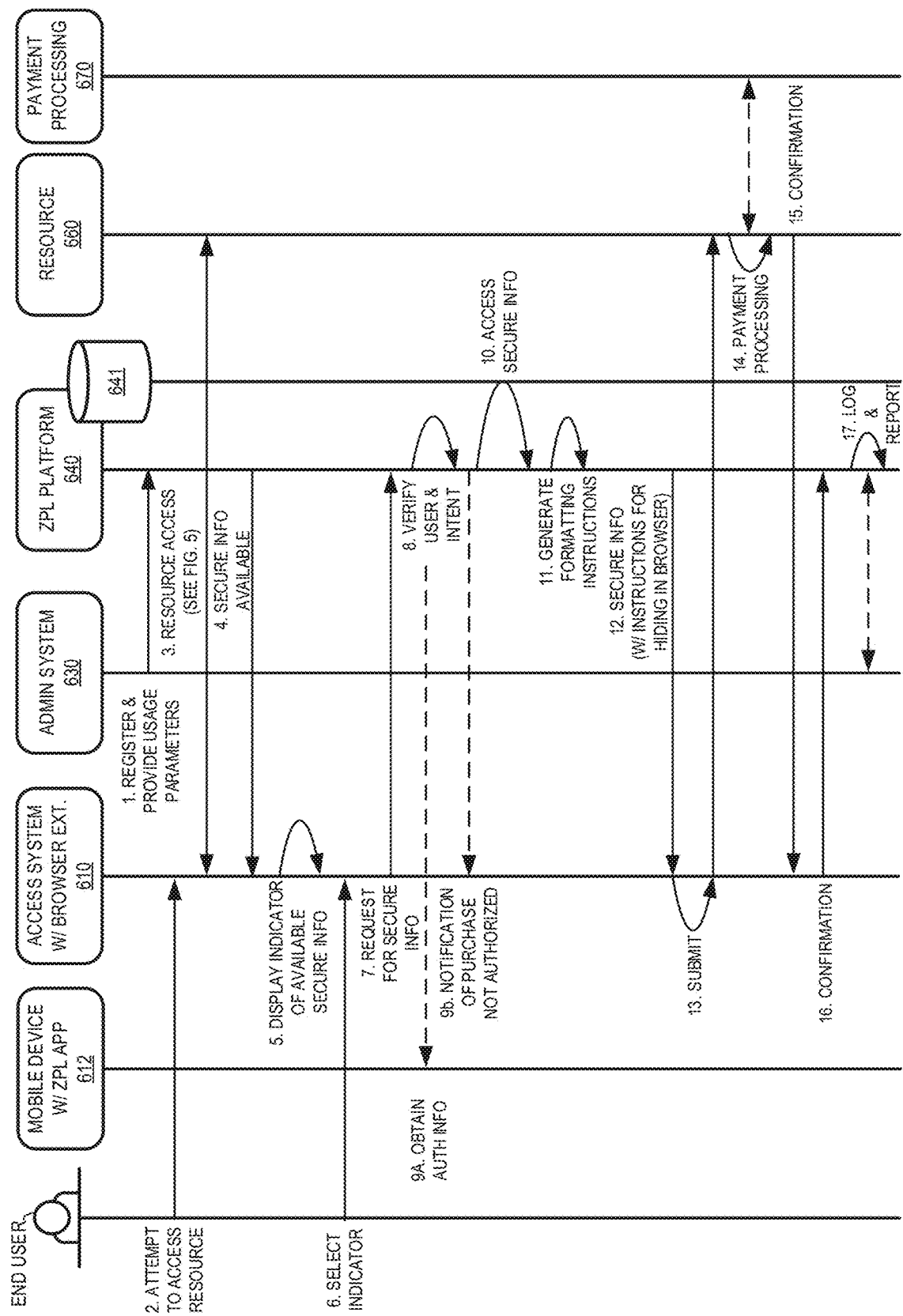
FIG. 6 depicts a sequence diagram illustrating example operation in an example for facilitating context-based possession-less access to secure information, according to some embodiments.

FIG. 6 depicts a sequence diagram illustrating example operation of various devices, systems, and an end users for facilitating context-based possession-less access to secure information, according to some embodiments. More specifically, FIG. 6 illustrates a scenario in which an end user (employee) is able to access and provide secure information to a resource without gaining possession of the secure information.

Like FIG. 5, the example of FIG. 6 includes a secondary authentication device (mobile device 612 having a ZPL application installed thereon), an access system with a browser extension 610, an administrator system 630, a credential management and secure information (zero password login) platform 640 with data store 641, and a resource 660. In addition, the example of FIG. 6 also includes a payment processing system 670.

Initially, at step 1, an enterprise system administrator or other authorized personnel registers the secure information with the credential management and secure information (zero password login) platform 640 as discussed herein. At step 2, the end user (employee) subsequently attempts to access the resource and, at step 3, resource access is established. FIG. 5 provides an example whereby an access system obtains access to a resource without providing a password, e.g., zero password login.

At step 4, responsive to the access system gaining access to the resource, the credential management and secure information (zero password login) platform 640 determines that secure information is available for use by the user via the access system on the resource and sends a notification that the secure information is available. At step 5, the access system displays the indicator of available secure information. As discussed above, in some embodiments, the indicator can be displayed as button or other indication on the browser session.

At step 6, the end user selects the indicator, e.g., via mouse click or touch screen and, at step 7, the access system responsively generates a request for secure information and sends the request to the credential management and secure information (zero password login) platform 640. The credential management and secure information (zero password login) platform 640 receives the request and, at step 8 verifies the identity of the user and intent of the secure access request. At step 9A, the credential management and secure information (zero password login) platform 640 requests authentication information from the mobile device to authenticate the identity of the user as discussed herein. If the user is not authenticated, at step 9B, the credential management and secure information (zero password login) platform 640 notifies the access system, e.g., purchase not authorized.

If the user is authenticated and the intent approved, at step 10, the credential management and secure information (zero password login) platform 640 accesses the secure information and, at step 11, generates formatting instructions for hiding the secure information in the browser or browser extension of the access system. At step 12, the credential management and secure information (zero password login) platform 640 sends the secure information with instructions for hiding.

At step 13, the access system submits the secure information to the resource. As discussed herein, in some embodiments the submission is automatic. In other embodiments, the submission occurs as a result of the end user providing input via a mouse click or touchscreen of the access system. At step 14, the secure information is received at the resource and the payment processed via a payment processing system 670. In this example, the secure information comprise credit card payment information.

At steps 15 and 16, a confirmation is optionally sent from a resource for delivery to the access system which, in turn, provides a confirmation to the credential management and secure information (zero password login) platform 640. Lastly, the credential management and secure information (zero password login) platform 640 logs the exchange and provides notifications or reports as necessary.

Figure 7:
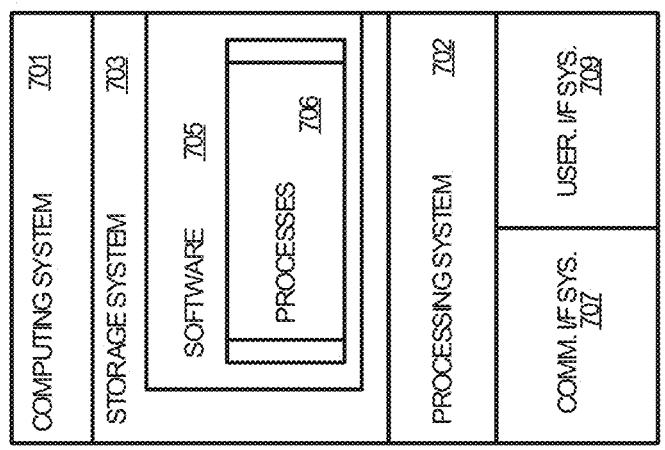
FIG. 7 illustrates a computing system suitable for implementing any of the architectures, components, applications, services, processes, and operational scenarios disclosed herein with respect to FIGS. 1-6 and discussed below in the Technical Disclosure.

FIG. 7 illustrates computing system 701 that is representative of any system or collection of systems in which the various operational architectures, scenarios, and processes disclosed herein may be implemented. Examples of computing system 701 include, but are not limited to, smart phones, laptop computers, tablet computers, desktop computers, hybrid computers, gaming machines, virtual machines, smart televisions, smart watches and other wearable devices, as well as any variation or combination thereof. In other examples, other types of computers may be involved in the processes, including server computers, rack servers, web servers, cloud computing platforms, and data center equipment, as well as any other type of physical or virtual server machine, and any variation or combination thereof.

Computing system 701 may be implemented as a single apparatus, system, or device or may be implemented in a distributed manner as multiple apparatuses, systems, or devices. Computing system 701 includes, but is not limited to, processing system 702, storage system 703, software 705, communication interface system 707, and user interface system 709. Processing system 702 is operatively coupled with storage system 703, communication interface system 707, and user interface system 709.

Processing system 702 loads and executes software 705 from storage system 503. Software 705 can include a various example processes, which are representative of the processes discussed with respect to the preceding FIGS. 1-6. When executed by processing system 702 to facilitate secure credential-free user access to resources, software 705 directs processing system 702 to operate as described herein for at least the various processes, operational scenarios, and sequences discussed in the foregoing implementations. Computing system 701 may optionally include additional devices, features, or functionality not discussed for purposes of brevity.

Referring still to FIG. 7, processing system 702 may comprise a micro-processor and other circuitry that retrieves and executes software 705 from storage system 703. Processing system 702 may be implemented within a single processing device, but may also be distributed across multiple processing devices or sub-systems that cooperate in executing program instructions. Examples of processing system 702 include general purpose central processing units, application specific processors, and logic devices, as well as any other type of processing device, combinations, or variations thereof.

Storage system 703 may comprise any computer readable storage media readable by processing system 702 and capable of storing software 705. Storage system 703 may include volatile and nonvolatile, removable and non-removable media implemented in any method or technology for storage of information, such as computer readable instructions, data structures, program modules, or other data. Examples of storage media include random access memory, read only memory, magnetic disks, optical disks, flash memory, virtual memory and non-virtual memory, magnetic cassettes, magnetic tape, magnetic disk storage or other magnetic storage devices, or any other suitable storage media. In no case is the computer readable storage media a propagated signal.

In addition to computer readable storage media, in some implementations storage system 703 may also include computer readable communication media over which at least some of software 705 may be communicated internally or externally. Storage system 703 may be implemented as a single storage device, but may also be implemented across multiple storage devices or sub-systems co-located or distributed relative to each other. Storage system 703 may comprise additional elements, such as a controller, capable of communicating with processing system 702 or possibly other systems.

Software 705 may be implemented in program instructions and among other functions may, when executed by processing system 702, direct processing system 702 to operate as described with respect to the various operational scenarios, sequences, and processes illustrated herein. For example, software 705 may include program instructions for implementing enhanced callback operations and related functionality.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 705 may include additional processes, programs, or components, such as operating system software or other application software, in addition to or that include callback process 706. Software 705 may also comprise firmware or some other form of machine-readable processing instructions executable by processing system 702.

In general, software 705 may, when loaded into processing system 702 and executed, transform a suitable apparatus, system, or device (of which computing system 701 is representative) overall from a general-purpose computing system into a special-purpose computing system customized to facilitate enhanced callback operations. Indeed, encoding software 705 on storage system 703 may transform the physical structure of storage system 703. The specific transformation of the physical structure may depend on various factors in different implementations of this description. Examples of such factors may include, but are not limited to, the technology used to implement the storage media of storage system 703 and whether the computer-storage media are characterized as primary or secondary storage, as well as other factors.

For example, if the computer readable storage media are implemented as semiconductor-based memory, software 705 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

It may be understood that computing system 701 is generally intended to represent a computing system or systems on which software 705 may be deployed and executed in order to implement enhanced callback operations. However, computing system 701 may also be suitable as any computing system on which software 705 may be staged and from where it may be distributed, transported, downloaded, or otherwise provided to yet another computing system for deployment and execution, or yet additional distribution.

Communication interface system 707 may include communication connections and devices that allow for communication with other computing systems (not shown) over communication networks (not shown). Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

User interface system 709 may include a keyboard, a mouse, a voice input device, a touch input device for receiving a touch gesture from a user, a motion input device for detecting non-touch gestures and other motions by a user, and other comparable input devices and associated processing elements capable of receiving user input from a user. Output devices such as a display, speakers, haptic devices, and other types of output devices may also be included in user interface system 709. In some cases, the input and output devices may be combined in a single device, such as a display capable of displaying images and receiving touch gestures. The aforementioned user input and output devices are well known in the art and need not be discussed at length here.

User interface system 709 may also include associated user interface software executable by processing system 702 in support of the various user input and output devices discussed above. Separately or in conjunction with each other and other hardware and software elements, the user interface software and user interface devices may support a graphical user interface, a natural user interface, or any other type of user interface.

Communication between computing system 701 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses, computing backplanes, or any other type of network, combination of network, or variation thereof. The aforementioned communication networks and protocols are well known and need not be discussed at length here. However, some communication protocols that may be used include, but are not limited to, the Internet protocol (IP, IPv4, IPv6, etc.), the transfer control protocol (TCP), and the user datagram protocol (UDP), as well as any other suitable communication protocol, variation, or combination thereof.

In any of the aforementioned examples in which data, content, or any other type of information is exchanged, the exchange of information may occur in accordance with any of a variety of protocols, including FTP (file transfer protocol), HTTP (hypertext transfer protocol), REST (representational state transfer), WebSocket, DOM (Document Object Model), HTML (hypertext markup language), CSS (cascading style sheets), HTML5, XML (extensible markup language), JavaScript, JSON (JavaScript Object Notation), and AJAX (Asynchronous JavaScript and XML), as well as any other suitable protocol, variation, or combination thereof.

The functional block diagrams, operational scenarios and sequences, and flow diagrams provided in the Figures are representative of exemplary systems, environments, and methodologies for performing novel aspects of the disclosure. While, for purposes of simplicity of explanation, methods included herein may be in the form of a functional diagram, operational scenario or sequence, or flow diagram, and may be described as a series of acts, it is to be understood and appreciated that the methods are not limited by the order of acts, as some acts may, in accordance therewith, occur in a different order and/or concurrently with other acts from that shown and described herein. For example, those skilled in the art will understand and appreciate that a method could alternatively be represented as a series of interrelated states or events, such as in a state diagram. Moreover, not all acts illustrated in a methodology may be required for a novel implementation.

The descriptions and figures included herein depict specific implementations to teach those skilled in the art how to make and use the best option. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

The invention claimed is:

1. An access system comprising:
one or more processors; and
one or more computer readable storage media having program instructions stored thereon which, when executed by the one or more processors, cause the access system to:
direct a browser session to display an indication of an availability of secure information;
responsive to receiving a trigger for the secure information, send, to a transparent proxy system, a request for the secure information;
subsequent to receiving, from the transparent proxy system, the secure information with formatting instructions for preventing access by an end user to the secure information, provide the secure information to a protected resource;
in response to determining that the protected resource is protected, send, to the transparent proxy system, a request for login credentials associated with the protected resource;
receive, from the transparent proxy system and without intervention of a user associated with a client device, login credentials;
populate a login form of the protected resource with the login credentials; and
submit the login form for access to the protected resource by the user, without saving the login credentials to a memory within the access system, wherein, subsequent to submitting the login credentials, the login credentials are no longer accessible by the access system.

2. The access system of claim 1, wherein the request for the secure information comprises an identity of the end user.

3. The access system of claim 1, wherein the formatting instructions comprise instructions for making portions of the browser session non-transparent to the end user.

4. The access system of claim 3, wherein the formatting instructions further comprise instructions for adding one or more additional non-transparent layers to the portions of the browser session.

5. The access system of claim 1, wherein the formatting instructions further comprise instructions for automatically submitting a page of the browser session that includes the secure information without active participation from the end user.

6. The access system of claim 1, wherein the end user is an employee or contractor associated with an enterprise.

7. The access system of claim 1, wherein the instructions, when executed by the one or more processors, further cause the access system to send, to the transparent proxy system, usage parameters associated with an administrative dashboard, and wherein the usage parameters define a scope of acceptable intents.

8. The access system of claim 1, wherein the request for the secure information comprises a request for payment information for a particular purchase.

9. The access system of claim 1, wherein the trigger comprises a selection corresponding to the availability of the secure information.

10. The access system of claim 1, wherein the trigger comprises a submission of a page of the browser session.

11. The access system of claim 1, wherein the secure information comprises secure enterprise identification information.

12. The access system of claim 11, wherein the secure enterprise identification information comprises enterprise credit card payment information.

13. A method of operating an access system, the method comprising:
directing a browser session to display an indication of an availability of secure information;
responsive to receiving a trigger for the secure information, sending, to a transparent proxy system, a request for the secure information; and
subsequent to receiving, from the transparent proxy system, the secure information with formatting instructions for preventing access by an end user to the secure information, providing the secure information to a protected resource;
in response to determining that the protected resource is protected, send, to the transparent proxy system, a request for login credentials associated with the protected resource;
receive, from the transparent proxy system and without intervention of a user associated with a client device, login credentials;
populate a login form of the protected resource with the login credentials; and
submit the login form for access to the protected resource by the user, without saving the login credentials to a memory within the access system, wherein, subsequent to submitting the login credentials, the login credentials are no longer accessible by the access system.

14. The method of claim 13, wherein the formatting instructions comprise instructions for making portions of the browser session non-transparent to the end user.

15. The method of claim 14, wherein the formatting instructions further comprise instructions for adding one or more additional non-transparent layers to the portions of the browser session.

16. The method of claim 13, wherein the formatting instructions further comprise instructions for automatically submitting a page of the browser session that includes the secure information without active participation from the end user.

17. A computer readable storage media having program instructions stored thereon which, when executed by one or more processors, cause the one or more processors to:
direct a browser session to display an indication of an availability of secure information;
responsive to receiving a trigger for the secure information, send, to a transparent proxy system, a request for the secure information; and
subsequent to receiving, from the transparent proxy system, the secure information with formatting instructions preventing access by an end user to the secure information, provide the secure information to a protected resource;
in response to determining that the protected resource is protected, send, to the transparent proxy system, a request for login credentials associated with the protected resource;
receive, from the transparent proxy system and without intervention of a user associated with a client device, login credentials;
populate a login form of the protected resource with the login credentials; and
submit the login form for access to the protected resource by the user, without saving the login credentials to a memory within the access system, wherein, subsequent to submitting the login credentials, the login credentials are no longer accessible by the access system.

18. The computer readable storage media of claim 17, wherein the formatting instructions comprise instructions for making portions of the browser session non-transparent to the end user.

19. The computer readable storage media of claim 18, wherein the formatting instructions further comprise instructions for adding one or more additional non-transparent layers to the portions of the browser session.

20. The computer readable storage media of claim 17, wherein the formatting instructions further comprise instructions for automatically submitting a page of the browser session that includes the secure information without active participation from the end user.

* * * * *